United States Patent Office 3,438,806
Patented Apr. 15, 1969

3,438,806
PROCESS FOR THE MANUFACTURE OF CIGA-
RETTE CONTAINING CYANAMIDE-CELLULOSE
ACETATE FILTER ELEMENTS
Ralph Joseph Chamberlain, Glenbrook, Conn., assignor to American Cyanamid Company, Stamford, Conn., a corporation of Maine
No Drawing. Original application May 20, 1965, Ser. No. 457,281, now Patent No. 3,319,629, dated May 16, 1967. Divided and this application Nov. 18, 1966, Ser. No. 595,339
Int. Cl. A24c 1/06; C08b 27/08; B32b 32/00
U.S. Cl. 117—144                        3 Claims

ABSTRACT OF THE DISCLOSURE

A filter material, useful as a smoke filter element in cigarettes, is manufactured by passing cationic cyanamide-cellulose acetate tow through an aqueous suspension of pigmentary activated carbon and drying the tow.

---

This is a division of my copending application Ser. No. 457,281 filed May 20, 1965, now U.S. Patent No. 3,319,629.

The present invention relates to processes for the manufacture of smoke filter material, particularly useful as the smoke filter element in filter cigarettes.

At the present time, cigarettes generally contain a filter element adapted to remove noxious components from the smoke which is produced when a cigarette burns.

It has long been recognized that activated carbon is effective and generally desirable as a filter material in cigarettes, being non-toxic and cheap and having a high adsorptive capacity for the noxious elements of cigarette smoke.

Activated carbon is manufactured both in highly particulate and in coarsely granular state. Because of its high specific surface area, colloidal activated carbon has excellent adsorptive capacity for the noxious components in cigarette smoke, but up to the present time, activated carbon in this form has not been found to have the physical properties needed for successful use in cigarettes. Highly particulate carbon (i.e., carbon the particles of which are finer than 325 mesh or 44 microns in average diameter), when present within the filter end of a cigarette so as to form a filter zone therein, tends to become a compact mass when the cigarette is smoked and to block the passage of smoke from the cigarette. When dispersed into the tobacco near the exit end of the cigarette it tends to be picked up by the stream of smoke, causing unsightly blackening of the smoker's lips and mouth.

As a result, activated carbon, when employed for cigarette manufacture, is customarily used in coarse granular state, being present in the cigarette as a filter zone at the exit end and being held in place by a porous plug or disc. The carbon is thus present in non-optimum form, as its adsorptive capabilities for smoke are not at a maximum when it is in coarse granular state.

The discoveries have now been made that highly particulate activated carbon is strongly self-adsorbed on cationic cyanamide-cellulose acetate tow when such tow is passed through an aqueous suspension of colloidal activated carbon, and that such carbon-containing tow acts as an efficient filter element in cigarettes. The present invention thus makes colloidal carbon conveniently available as a smoke filtering agent in cigarettes. In the filter, the particles of activated carbon are supported in discrete state on filaments of cyanamide-cellulose acetate.

The "activated carbon" present in the filter element of the present invention is any carbon which has a high adsorptive capacity for organic vapors. Thus the carbon may be charcoal produced by the destructive distillation of vegetable matter (with or without the addition of chemicals), or may be norit, or bone black, or carbon black (lamp black, Paris black) made by partial combustion of natural gas.

The activated carbon present in the filter material of the present invention is highly particulate and in general it is preferred that the particle size of the carbon be as small as possible. The particles may be in the pigmentary range ($5\mu$ to $0.1\mu$), but preferably they are in the colloidal range ($0.1\mu$ to $0.001\mu$). This corresponds to specific surface areas from about five to several hundred square meters per gram.

The filter material of the present invention is prepared by passing cyanamide-cellulose acetate tow through an aqueous suspension of the highly particulate activated carbon until it has adsorbed the desired amount of the particles. The suspension may consist of 1%–10% by weight of activated carbon particles suspended in water, which may contain one or more anti-flocculants for the carbon. The concentration of carbon in the suspension should be such that the suspension is freely fluid.

Dry activated carbon generally exists in aggregated or flocculated state, and it is necessary to reduce these aggregates at least to pigmentary dimensions before contacting the cyanamide-cellulose acetate tow therewith. This may be done by ball milling the carbon as an aqueous slurry until the desired degree of comminution and deflocculation has been attained.

Preferably passage of the tow through the suspension is continued until the adsorptive capacity of the tow for the carbon black is substantially satisfied, i.e., until substantially no further weight increase results from continued residence of the tow in the suspension. This avoids non-use of the adsorptive sites introduced by the cyanamide on the one hand and causes as much carbon as possible to be adsorbed on the filaments of the tow on the other hand.

Cellulose acetate tow is made by extruding cellulose acetate solution into a coagulating bath through a spinerette head ½"–1" in diameter containing 5,000–15,000 microscopic holes, and crimping and washing (and if desired drying) the resulting tow. The tow thus consists essentially of thousands of smooth, crimped filaments of cellulose acetate in substantially parallel, loose array.

The cationic cyanamide-cellulose acetate tow used in the present invention may be prepared by treating cellulose acetate tow with an aqueous alkaline solution of free cyanamide ($H_2NCN$) to form a cationic nitrogenated product, and then treating the tow with an acid. Details of such a method are shown in Elizer et al. U.S. Patent No. 3,051,698. The treatment of the tow with cyanamide is carried at least to the point where the cellulose acetate is rendered cationic, as shown by the mobility of the product in an electrophoresis cell. The nitrogen content of such tow is small and is generally less than 0.2% of the dry weight of the tow, as determined by the Kjeldahl method. Preferably the treatment is carried as far as possible without significantly altering the physical properties of the tow. The reaction may be carried to the point where the product has a nitrogen content of 0.5% by weight and even larger amounts of cyanamide can be reacted with the cyanamide so as to form a tow containing more than this amount of nitrogen. The structural formula of cyanamide-cellulose acetate has not been ascertained, and while theoretical considerations indicate that the product may be described chemically as a guanyl cellulose acetate, the presence of guanyl substituents has not been proved. In the specification and claims, therefore, the term "cyanamide-cellulose acetate" is used to describe cellulose acetate which has been rendered cationic by reaction with cyanamide.

If desired, the tow leaving the aqueous suspension of highly particulate carbon may be dried and used in the manufacture of filter cigarettes without further treatment. However, a significant amount of carbon may be mechanically entrained by the tow and this amount may be sufficient to blacken the lips of those smoking cigarettes which contain the filter. It is therefore preferred to remove this entrained carbon, and this may be done before the tow is dried by mechanically agitating the tow in plain water which, if desired, may contain a surface active agent to facilitate the removal. In either event, brief agitation causes disengagement and removal of substantially all of such mechanically entrained carbon. The carbon which remains is strongly adsorbed and remains attached to the filter material substrate while the cigarette is being smoked.

The tow of the present invention is an efficient adsorbent of vapors which are adsorbed by activated carbon in unsupported state but has substantially no filtering action on the particles which constitute the solid phase of cigarette smoke.

The invention will be more particularly illustrated by the examples which follow. These examples constitute preferred embodiments of the invention and are not to be construed as limitations thereof.

Example 1

Cationic cyanamide-cellulose acetate tow is prepared as follows.

A treating bath is prepared by adding 11.25 liters of water containing 0.75 k.g. of NaOH to 3 liters of 50% aqueous cyanamide solution. The pH of the solution is 11. Through this solution at room temperature is slowly and continuously passed 2,222 g. of white well-crimped cellulose acetate tow (Estron-Eastman Chemical Co., 50,000 total denier). The dwell time of the tow in the solution is 10 minutes. The tow is passed through squeeze rolls to provide an aqueous content about equal to the dry weight of the tow (100% solution pickup). The tow is placed in a circulating hot air oven at 200° F. for 13 minutes and is then dry. The tow is immediately submerged in 4 liters of water containing 0.4 kg. of 37% hydrochloric acid (pH 1.3) for 15 minutes, after which the tow is squeezed, washed in four changes of water, and dried at 190° F. in an electric clothes drier.

The resulting tow is white and fluffy and only slightly crimped, and weighs 2122 g. Its nitrogen content (Kjeldahl) is 0.12% based on its dry weight.

The tow thus prepared is converted into a carbon-containing filter material as follows.

An aqueous suspension of pigmentary activated carbon is prepared by ball-milling for 18 hours a slurry of 200 g. of −50 +200 mesh activated coconut shell carbon made into paste with 540 g. of water. The particles in the product are all finer than 44$\mu$; about 50% by weight of the particles are 26$\mu$ in diameter, and many are of much greater fineness.

Through 184 g. of the above slurry made up to 1 liter with water is slowly passed 50 g. of the dry cyanamide-cellulose acetate tow prepared as described above (dwell time 15 seconds). The tow is squeezed to remove free liquid, washed several times in water, and air dried. The resulting tow is jet black and contains 12% carbon by weight. It possesses little tendency to blacken the hands when rubbed thereon. The tow does not release carbon as a dust when slapped upon a surface.

Example 2

The coarse activated carbon granules (and restraining tip covering) are removed from the tip of a commercial filter-tip cigarette. The dry carbon-containing cyanamide-cellulose tow of Example 1 is compressed to a rope about ¼" in diameter by manual twisting. The rope is pushed into the ½" cavity left by the granules and is cut off flush with the end of the cigarette. When the cigarette is smoked, the filter element removes tars from the smoke.

I claim:

1. A process for manufacturing a filter material from cationic cyanamide-cellulose acetate tow, which consists essentially in passing said tow through an aqueous suspension of pigmentary activated carbon thereby adsorbing colloidal activated carbon on the filaments of said tow, and drying said tow.

2. A process according to claim 1 wherein said tow is passed through said suspension until the adsorptive capacity of said tow for said carbon is substantially satisfied.

3. A process according to claim 1 wherein the tow after passage through said suspension and prior to said drying is washed with water to remove any unadsorbed carbon therein.

References Cited

UNITED STATES PATENTS

| | | | |
|---|---|---|---|
| 2,794,239 | 6/1957 | Crawford et al. | 206—59 |
| 2,794,480 | 6/1957 | Crawford et al. | 156—441 |
| 2,881,770 | 4/1959 | Towey | 131—266 |
| 3,043,736 | 7/1962 | Towey | 156—152 |
| 3,051,698 | 8/1962 | Elizer et al. | 260—212 |
| 3,311,519 | 3/1967 | Towey et al. | 131—268 X |

WILLIAM D. MARTIN, *Primary Examiner.*

M. LUSIGNAN, *Assistant Examiner.*

U.S. Cl. X.R.

117—102, 169